A. BERNSTEIN.
Liquid-Measure.
No. 203,105. Patented April 30, 1878.
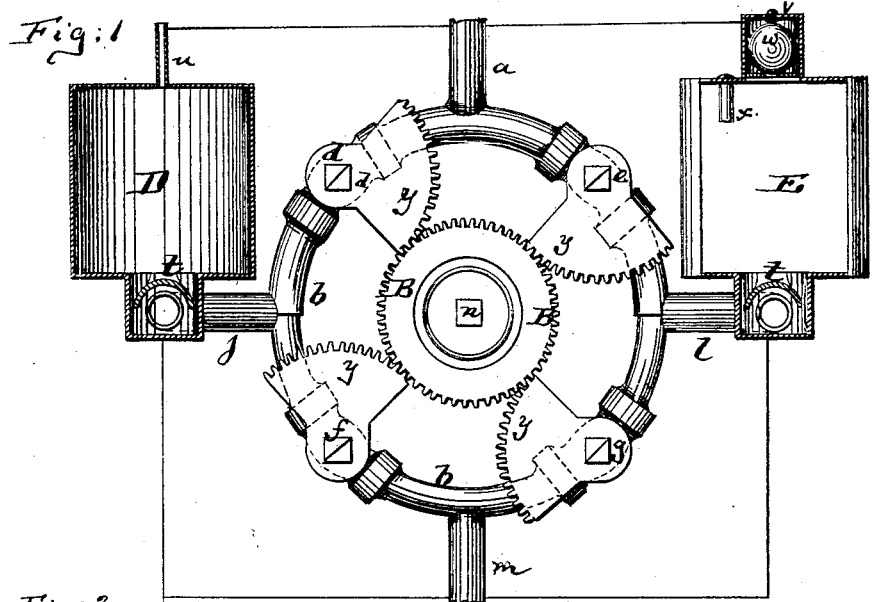
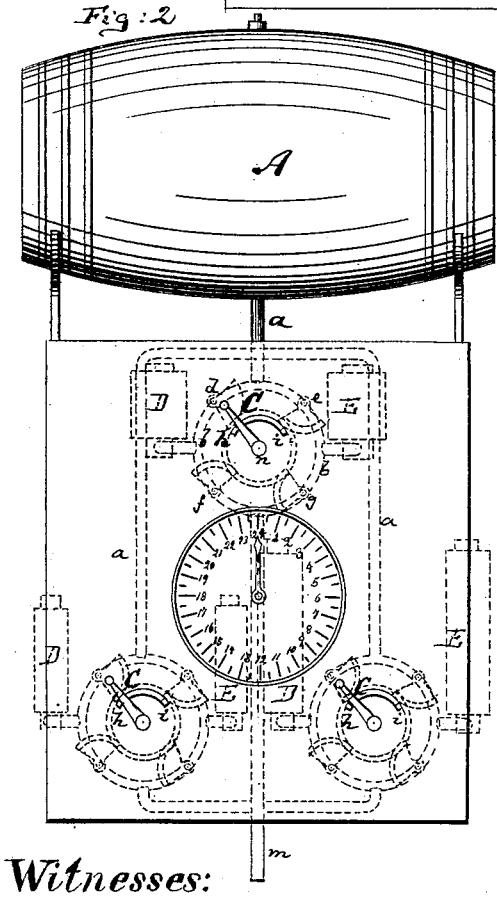
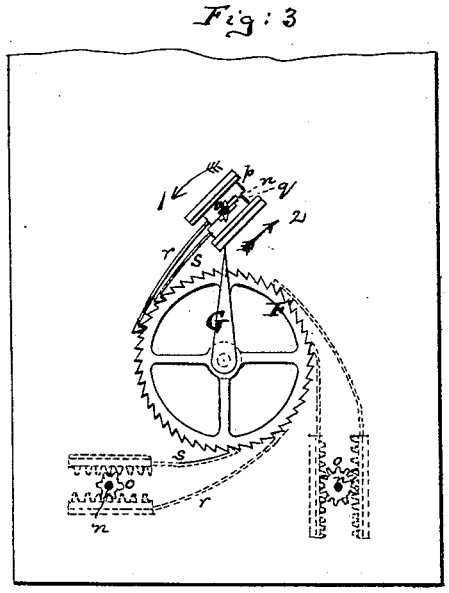
Witnesses:
D. v. Briesen
John C. Tunbridge
Inventor:
Dr. Aron Bernstein
by his attorney
A. v. Briesen

UNITED STATES PATENT OFFICE.

ARON BERNSTEIN, OF FRIEDENAU, PRUSSIA.

IMPROVEMENT IN LIQUID-MEASURES.

Specification forming part of Letters Patent No. 203,105, dated April 30, 1878; application filed February 19, 1878.

*To all whom it may concern:*

Be it known that I, ARON BERNSTEIN, of Friedenau, Prussia, have invented a new and Improved Apparatus for Measuring Liquids, of which the following is a specification:

Figure 1 is a face view, partly in section, of my improved apparatus for measuring liquids. Fig. 2 is an elevation of said apparatus, showing it arranged in three divisions. Fig. 3 is a back view thereof, showing the registering mechanism.

Similar letters of reference indicate corresponding parts in all the figures.

The object of this invention is to avoid the measuring of liquids by means of open portable vessels which can only be filled under inspection, and also to avoid all uncertainty, neglect, or accident in the filling of the measures, and also the spilling of the liquids in pouring from the measures, and the foaming of the liquids while being so poured, and, in fact, to avoid all the inconveniences and difficulties which are now connected with the measuring of liquids in large quantities.

Wholesale grocers and others who have to sell large quantities of liquids waste much time in the attempt to measure their goods; and much risk is furthermore connected with said process of measuring unless the same is entrusted to skillful and consequently expensive help.

My invention seeks to avoid all these inconveniences, and to produce an automatic measuring apparatus which will insure both the purchaser and seller that the exact quantity of liquid desired to be purchased and sold has actually been measured out.

Fig. 2 in the drawing represents the general appearance of the apparatus as it is intended to be used. In this figure the letter A represents a barrel or larger vessel from which the liquid to be measured is to be withdrawn. From this barrel extends the discharge-pipe $a$ into a ring-pipe, $b$, which ring-pipe has four valves, $d\ e\ f\ g$. The arrangement of the ring-pipe and its valves is fully shown in Fig. 1, and is such that the valves $d$ and $g$ are diametrically opposite each other, and also the valves $e\ f$. The spindles or stems of these valves are provided with toothed segments $y$, that mesh into a toothed wheel, B, which can be turned by means of a crank, C, attached to the shaft of the wheel B. Now, the crank moves only between two stops, $h\ i$, and can therefore not revolve, but only oscillate, the wheel B.

By moving the crank C against the stop $h$ the valves $d$ and $g$ are opened and the valves $e\ f$ closed, this being the position of the parts shown in Fig. 1. The liquid from the barrel A can, therefore, as it enters the ring-pipe through the inlet-pipe $a$, pass through the valve $d$, but not pass the valve $f$ on one side, while on the other it cannot pass beyond the valve $e$.

Between the valves $d$ and $f$ the ring-pipe connects, by a branch, $j$, with a measuring-vessel, D, and by another branch, $l$, the ring-pipe connects, between the valves $e$ and $g$, with another measuring-vessel, E.

The ring-pipe further connects, by a pipe, $m$, with the discharge-opening or faucet through which the liquid is to be discharged into the receiving-vessel, said pipe $m$ joining the ring between the valves $f$ and $g$, as clearly shown in Fig. 1.

The general operation of the apparatus will be readily understood from the following remarks: While the parts are in the position shown in Fig. 1, the liquid passes through the valve $d$ into the measuring-vessel D, which has a certain known capacity, and fills said vessel D. After the vessel D has been filled, the crank C is moved against the stop $i$, and thereby the valves $d$ and $g$ are closed, and the valves $e$ and $f$ opened. The vessel E will now be filled, and the vessel D will discharge its contents through the branch $j$ and valve $f$ into the pipe $m$, and thence into the receiving-vessel.

After the vessel E has been filled, the crank is again reversed against the stop $h$, so that the vessel E may discharge its contents into the receiving-vessel, and the vessel D be refilled from the barrel A, and so on until the proper quantity has been measured out. The attendant, therefore, has only to observe that the crank is reversed as soon as the discharge-pipe ceases to run. By so doing he insures the proper operation of the apparatus, and the exact measuring of the liquid flowing into the receiving-vessel.

Now, in Fig. 2 is shown by dotted lines the ring-pipe and its appendages connected into a treble system, the upper of which is like that shown in Fig. 1, while in the two lower ones the measuring-vessels D E are larger than in the upper.

Thus, if the upper series of measuring-vessels D E should each measure, say, one gallon, one of the lower would each contain, say, two gallons, and the other, say, four gallons, and thus the operator or attendant could permit the measuring either by single gallons, by two gallons, or by four gallons, or by any other suitable system of measures that may be desired. And it is quite clear, also, that each of the ring-pipes to the treble system, receiving its supply through a branch of the pipe $a$, will operate properly, provided the proper crank is reversed from time to time in manner already stated.

In order further to insure that the previously-empty vessel has been refilled during the time occupied in emptying the full vessel, I make the upper half of the ring-pipe $b$ slightly larger in diameter than the lower half, as shown in Fig. 1, so that the liquid will flow faster into the one measuring-vessel than it will escape from the other.

To record the number of gallons or other units of measure measured out by this apparatus, the spindle $n$ of the crank C is provided with a toothed wheel or pinion, $o$, whose teeth mesh into two sliding plates, $p$ and $q$, that are placed between proper guides against opposite sides of said toothed wheel. These slides $p$ and $q$ have projecting pawls $r$ and $s$, respectively, which pawls engage into the teeth of a ratchet-wheel, F, as clearly shown in Fig. 3. Said ratchet-wheel carries a pointer, G. Now, if the crank is turned in the direction of the arrow 1, Fig. 3, the sliding plate $p$ will move in the same direction; but the sliding plate $q$ will move in the direction of the arrow 2, and thereby take hold of the ratchet-wheel by means of its pawl $s$, and turn the ratchet-wheel to the extent of the motion of the slide, and in so turning will also turn the pointer G. Upon reversing the motion of the crank, the wheel F will be turned by the pawl $r$, while the pawl $s$ will slip thereon, &c., every motion of the crank serving to move the ratchet-wheel and the pointer a certain prescribed and exact distance, and the position of the pointer over a suitable graduated scale will consequently indicate the number of gallons or other units of measure that have passed through the apparatus. For the ring-pipe which connects with the smaller vessels D E, the toothed wheel $o$ is of lesser diameter than for the larger vessels, as indicated in Fig. 3, so that there may be a larger degree of motion to the wheel F, and a consequent recording of a greater number of gallons by the pointer when the crank has been set on the larger series of measuring-tanks than on the smaller ones.

The tanks or vessels D E, I prefer to construct as follows: I put a shield or plate, $t$, over the inlet or opening, which is at the lower part of the vessel, as shown in Fig. 1, to prevent foaming during the admission of liquids into such vessels. The upper part of each of these vessels should have a suitable air-discharge, either in the shape of a small pipe, $u$, as shown on the vessel D, or in the form of a small opening, $v$, as shown in the vessel E in Fig. 1. I prefer the opening $v$, which may be closed by a ball, $w$, that will be floated by the ascending liquid to close a valve against the opening $v$, and prevent the further escape of air or liquid through the opening $v$ as soon as the vessel has been properly filled. At the same time the ball may elevate through the opening $v$ a suitable index or marker, which should indicate to the attendant that the vessel is full. The exactness as to capacity of the vessels D E can be insured by the use of a plug, $x$, which is shown in Fig. 1. This plug is longer than is intended to use it, and is inserted into the vessel through an opening left in the same, and the contents of the vessel are then measured. The size of the plug, which is allowed to remain in position, is afterward regulated to render the contents exactly in accordance with the desired measure. This is necessary, because the vessels, as manufactured, are usually not of the exact measure desired, and invariably require some adjustment. Therefore I make the vessels slightly too large. If the vessel is found to be much too large, a greater length of plug $x$ is allowed to remain therein; and the size of the plug is reduced as it is found that the vessel does not materially exceed in capacity the prescribed size.

The plug, after it has been properly cut, is soldered fast or otherwise secured, so as to be an immovable part of the vessel.

I claim—

1. The measuring apparatus composed of the ring-pipe $b$, having valves $d\ e\ f\ g$, branch pipes $j\ l$, and measuring-vessels D E, substantially as herein shown and described.

2. The ring-pipe $b$, having the valves $d\ e\ f\ g$, combined with the measuring-vessels D E, said ring-pipe being made larger in diameter in its upper than in its lower half, substantially as and for the purpose specified.

3. The combination of the ring-pipe and its valves $d\ e\ f\ g$ with the toothed segments $y$, and with the toothed wheel B and its crank C, said crank moving between stops $h$ and $i$, substantially as and for the purpose specified.

4. The combination of the crank-spindle $n$ with the pinion $o$, slides $p\ q$, pawls $r\ s$, ratchet-wheel F, and index G, substantially as and for the purpose specified.

This specification signed by me this 29th day of December, 1877.

DR. ARON BERNSTEIN.

Witnesses:
FRIEDRICH CARL GLASER,
BERTHOLD ROI.